US006622162B2

(12) United States Patent
Kawasaki et al.

(10) Patent No.: US 6,622,162 B2
(45) Date of Patent: Sep. 16, 2003

(54) ELECTRONIC DOCUMENT CIRCULATING SYSTEM

(75) Inventors: Ariko Kawasaki, Kishiwada (JP); Hiroshi Majima, Yokohama (JP); Hisashi Ono, Yokohama (JP); Kazuhiro Suga, Ibaraki (JP); Takashi Horiuchi, Yao (JP); Tetsuji Toge, Kobe (JP)

(73) Assignee: Hitachi, Ltd., Tokyo (JP)

(*) Notice: Subject to any disclaimer, the term of this patent is extended or adjusted under 35 U.S.C. 154(b) by 252 days.

(21) Appl. No.: 09/880,773

(22) Filed: Jun. 15, 2001

(65) Prior Publication Data

US 2001/0047371 A1 Nov. 29, 2001

Related U.S. Application Data

(63) Continuation of application No. 09/124,235, filed on Jul. 29, 1998, now Pat. No. 6,279,031, which is a continuation of application No. 08/978,140, filed on Nov. 25, 1997, now Pat. No. 5,848,248, which is a continuation of application No. 08/531,620, filed on Sep. 21, 1995, now abandoned.

(30) Foreign Application Priority Data

Sep. 21, 1994 (JP) .............................................. 6-226509

(51) Int. Cl.$^7$ ............................................. G06F 13/00
(52) U.S. Cl. ..................................................... 709/207
(58) Field of Search ......................................... 709/207

(56) References Cited

U.S. PATENT DOCUMENTS

| 4,503,499 A | 3/1985 | Mason ........................ 395/671 |
| 5,040,142 A | 8/1991 | Mori ........................... 395/772 |
| 5,125,075 A | 6/1992 | Goodale et al. ............. 395/200 |

(List continued on next page.)

FOREIGN PATENT DOCUMENTS

| EP | 272561 | 6/1988 |
| EP | 438020 | 7/1991 |
| JP | 6225373 | 2/1987 |
| JP | 2184142 | 7/1990 |
| JP | 2278458 | 11/1990 |
| JP | 477030 | 6/1992 |
| JP | 563728 | 3/1993 |

OTHER PUBLICATIONS

S. Sarin et al, "A Process Model and System for Supporting Collaborative Work" Proceedings of the Conference on Organizational Computing Systems, Atlanta, GA, Nov. 5–8, 1991, vol. 12, No. 2, 3.

A. Schill, "Distributed System and Execution Model for Office Environments", Computer Communications, vol. 14, No. 8, Oct. 1991.

R. Parker, Microsoft Office 4 for Windows for Dummies, Jan. 1994, pp. 298–301.

(List continued on next page.)

Primary Examiner—Eric Coleman
(74) Attorney, Agent, or Firm—Antonelli, Terry, Stout & Kraus, LLP

(57) ABSTRACT

An electronic document circulating system utilizing a network, to attain simplification of the operation procedure by a transmitting person and facilitation of the temporary circulation of a document, a circulation control unit circulates the circular document indicated by document management information stored in a document management information store unit based on circulation control information indicative of a circular route of the circular document stored in a circulation control information store unit and role definition information for relating a plurality of users to a role shared among equal users stored in a role definition information store unit. The circular document is transmitted to a user selected based on a predetermined criterion, of users in the role designated by the transmitting person. When the document is transmitted for consultation, temporary circulation control information is set and the exact document is returned.

17 Claims, 14 Drawing Sheets

U.S. PATENT DOCUMENTS

| | | | | |
|---|---|---|---|---|
| 5,182,705 | A | | 1/1993 | Barr et al. .................... 364/401 |
| 5,285,203 | A | * | 2/1994 | Nakano ....................... 370/221 |
| 5,311,595 | A | | 5/1994 | Bjerrum et al. ................ 380/25 |
| 5,355,304 | A | | 10/1994 | DeMoranville ......... 364/413.02 |
| 5,408,333 | A | | 4/1995 | Kojima et al. ............... 358/400 |
| 5,437,838 | A | | 8/1995 | DeMoranville ............... 422/67 |
| 5,465,299 | A | | 11/1995 | Matsumoto et al. ........... 380/23 |
| 5,490,244 | A | | 2/1996 | Isensee et al. ............... 345/326 |
| 5,515,491 | A | | 5/1996 | Bates .......................... 395/155 |
| 5,535,322 | A | | 7/1996 | Hecht .......................... 395/155 |
| 5,548,506 | A | | 8/1996 | Srinivasan .............. 364/401 R |
| 5,555,299 | A | | 9/1996 | Maloney et al. ............ 379/212 |
| 5,581,691 | A | | 12/1996 | Hsu ....................... 395/182.13 |
| 5,623,653 | A | | 4/1997 | Matsuno ..................... 395/609 |
| 5,671,428 | A | | 9/1997 | Muranaga et al. ........... 707/511 |
| 5,767,847 | A | | 6/1998 | Mori et al. .................. 345/329 |
| 5,848,248 | A | | 12/1998 | Kawasaki et al. ........... 709/238 |

OTHER PUBLICATIONS

Bock, "TeamOffice" from ICL TeamWare: finding the deparmental groupware solution, The Workgroup Computing Report , Sep. 1994, vol. 17, No. 10, p. 3(18).

Marshak, "Rule–based messaging: using electronic mail as the vehicle for customized workflow applications", The Workgroup Computer Report, Oct. 1993, vol. 16, No. 10, p. 3(19).

Yukita et al, "Unix Whitebook, Stationary Unix" McGraw Hill Inc., Jul. 30, 1992, pp. 87–98.

The Nikkei Computer Magazine, No. 336, May 2, 1994, pp. 57–67.

Compton et al. "Intelligent Validation and routing of electronic forms in a distributed workflow environment" Artificial Intelligence, pp. 125–131.

Wilson et al, Structure planning: deriving project view Software Engineering Journal, vol. 5, No. 2, pp. 138–148.

Dayao et al "Superforms: A security–enhanced smart elecronic form management system" Globesom, 1990, IEEE Global Telecommunication Connecting the future, pp. 1079.

Dayao et al "Controllling workflow in groupware: design and operational requirements, methods and strategies", release 1.0, vol. 92, No. 9, pp. 10–12.

Robert Mills, "Going with the flow (workflow management systems for Engineering Organizations) (special report: managing Engineering Data)", computer–aided Engineering, vol. 13, No. 2, pp. psR17.

Schuster et al "A client/server architecture for distributed workflow management systems" University of Erlangen, pp. 1–14.

* cited by examiner

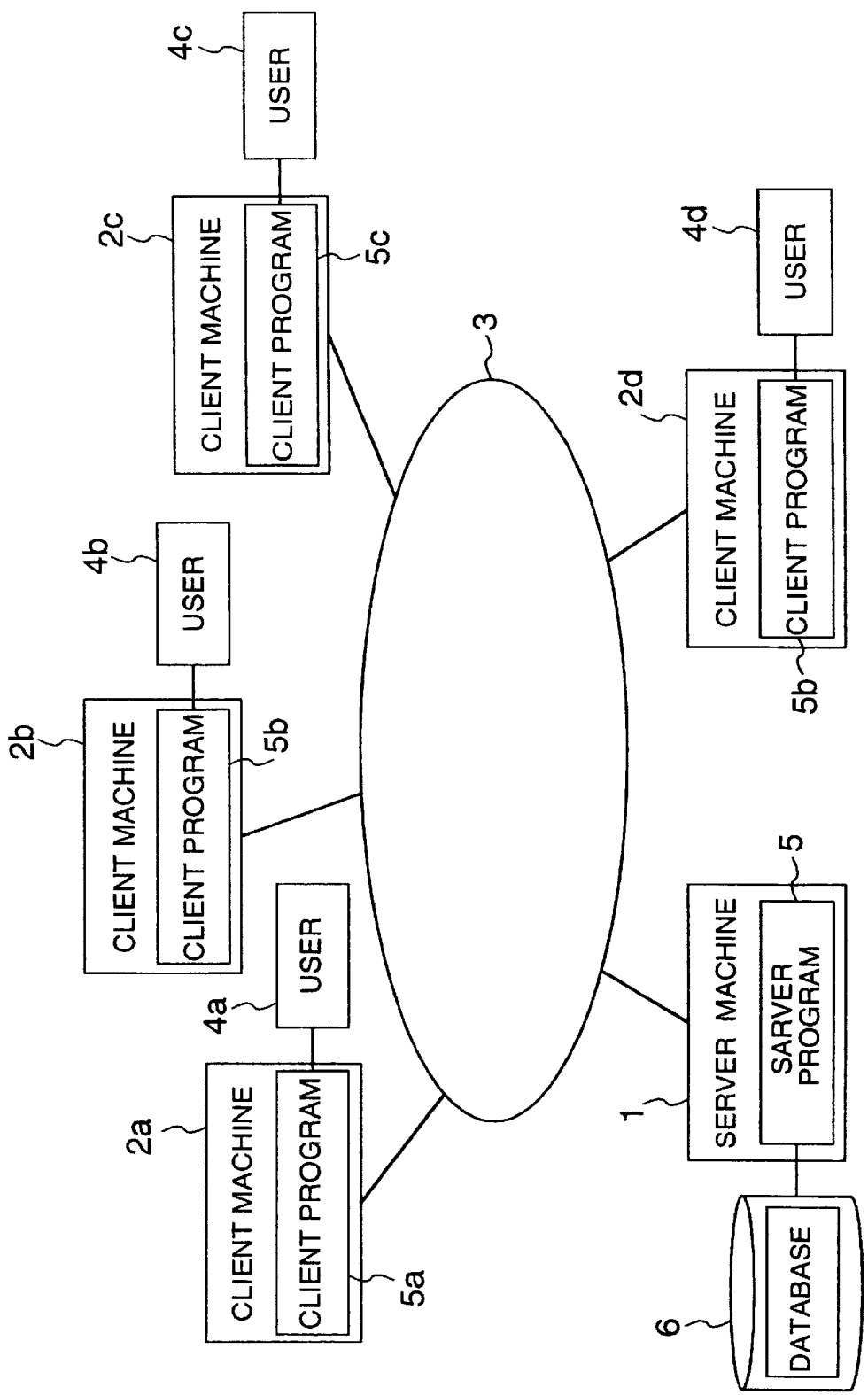

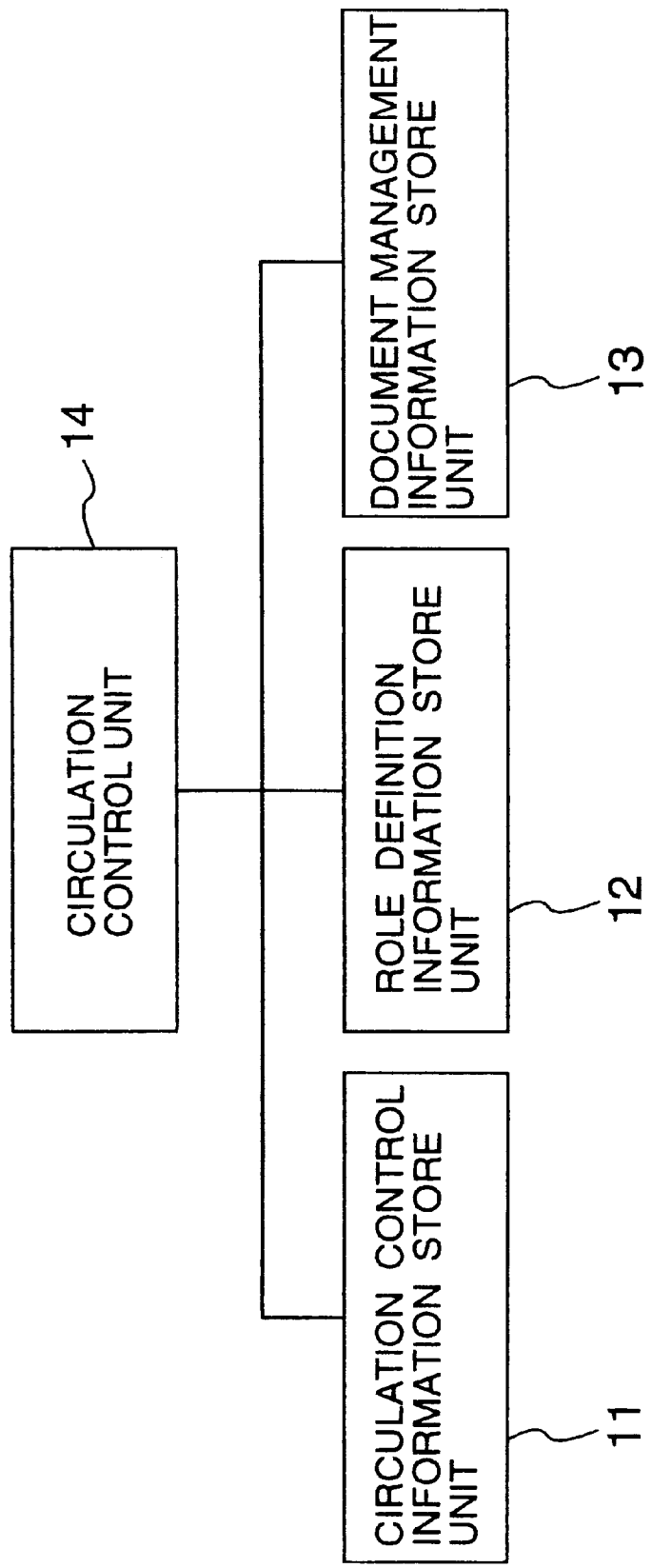

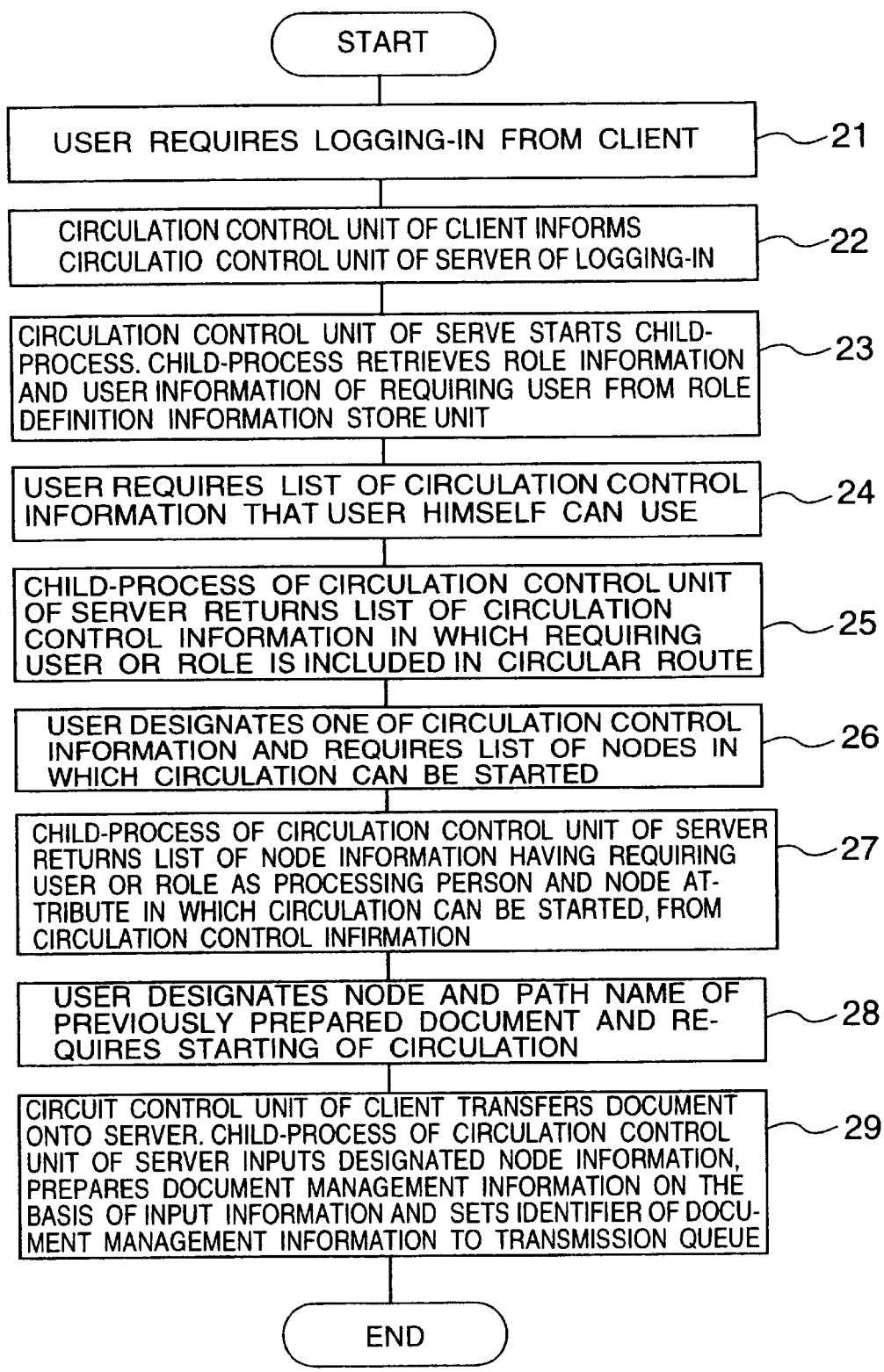

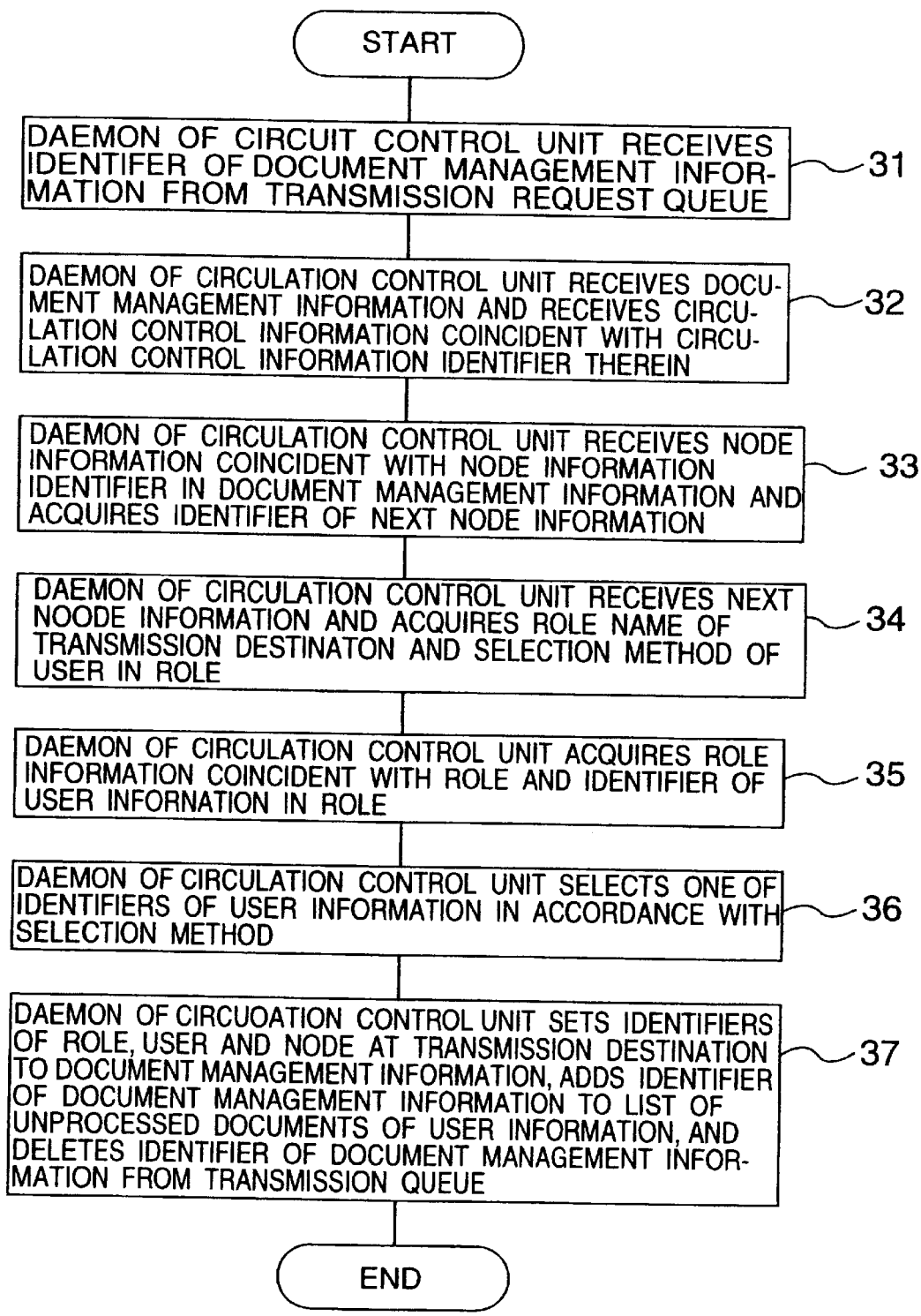

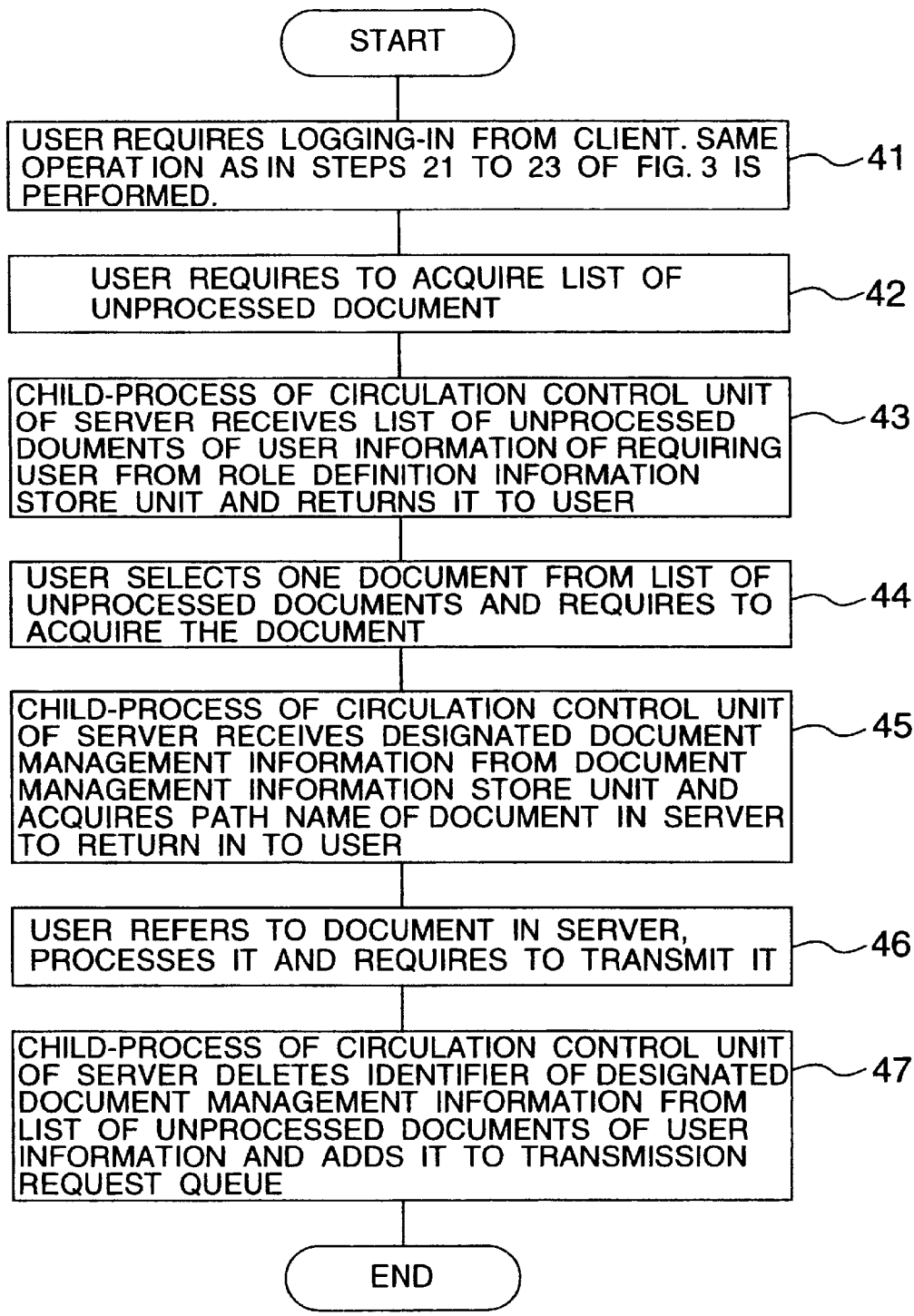

FIG.6

| CIRCULATION CONTROL INFORMATION IDENTIFIER | NODE INFORMATION LIST | CIRCULATION INFORMATION FILE |
|---|---|---|
| C0000008 | | |

51

52

| NODE IDENTIFIER | NODE TYPE | ROLE/ USER | ROLE NAME | USER/ NAME | IDENTIFIER OF USER AT TRANSMISSION DESTINATION FROM CIRCULATION CONTROL UNIT AT LAST TIME |
|---|---|---|---|---|---|
| NODE 1 | START OF CIRCULATION | ROLE | PREPARATION | | C0000025 |
| NODE 2 | PROCESSING | ROLE | EXAMINATION | | C0000027 |
| NODE 3 | PROCESSING | ROLE | APPROVAL | | C0000029 |

```
(#node node_1 NODE 1 PREPARATION PROCESS
  (#type #source)
  (#role PREPARATION #autodeliver #recursive GROUP 1)
  (#proc (#in ( ))
         (#out (ToObject (node_2)))))

(#node node_2 NODE 2 EXAMINATION PROCESS
  (#type #process)
  (#role EXAMINATION #autodeliver #random)
  (#proc
    (#in ( ))
    (#out (if @EXAMINATION = = "OK" then
              (ToObject (node_3))
            else (ToObject (node_1))))))

(#node node_3 NODE 3 APPROVAL PROCESS
  (#type #process)
  (#role APPROVAL #autodeliver #sequence)
  (#proc
    (#in ( ))
    (#out (if @APPROVAL = = "OK" then
              (EndFlow ( ))
            else (ToObject (node_1))))))
```

53

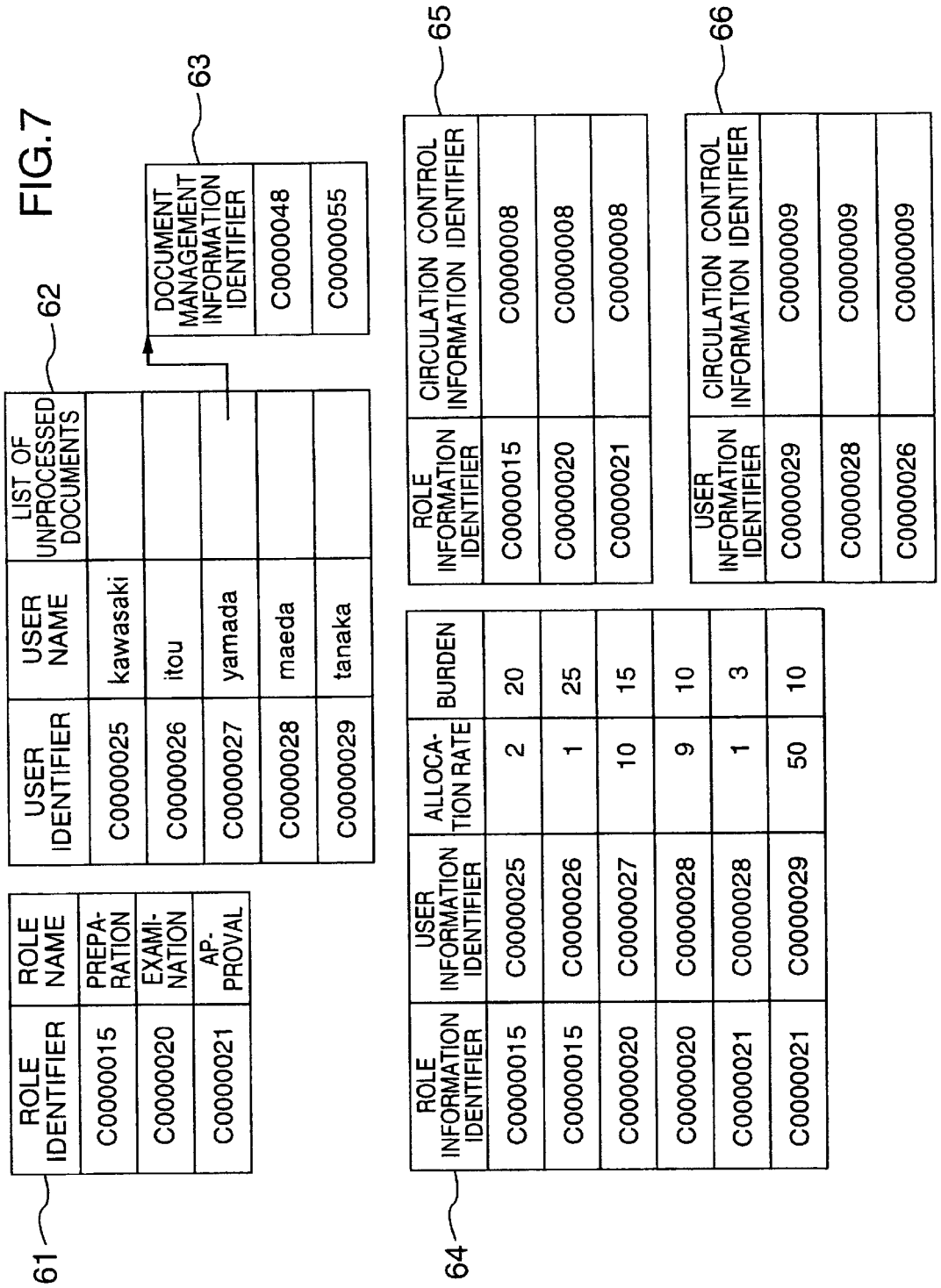

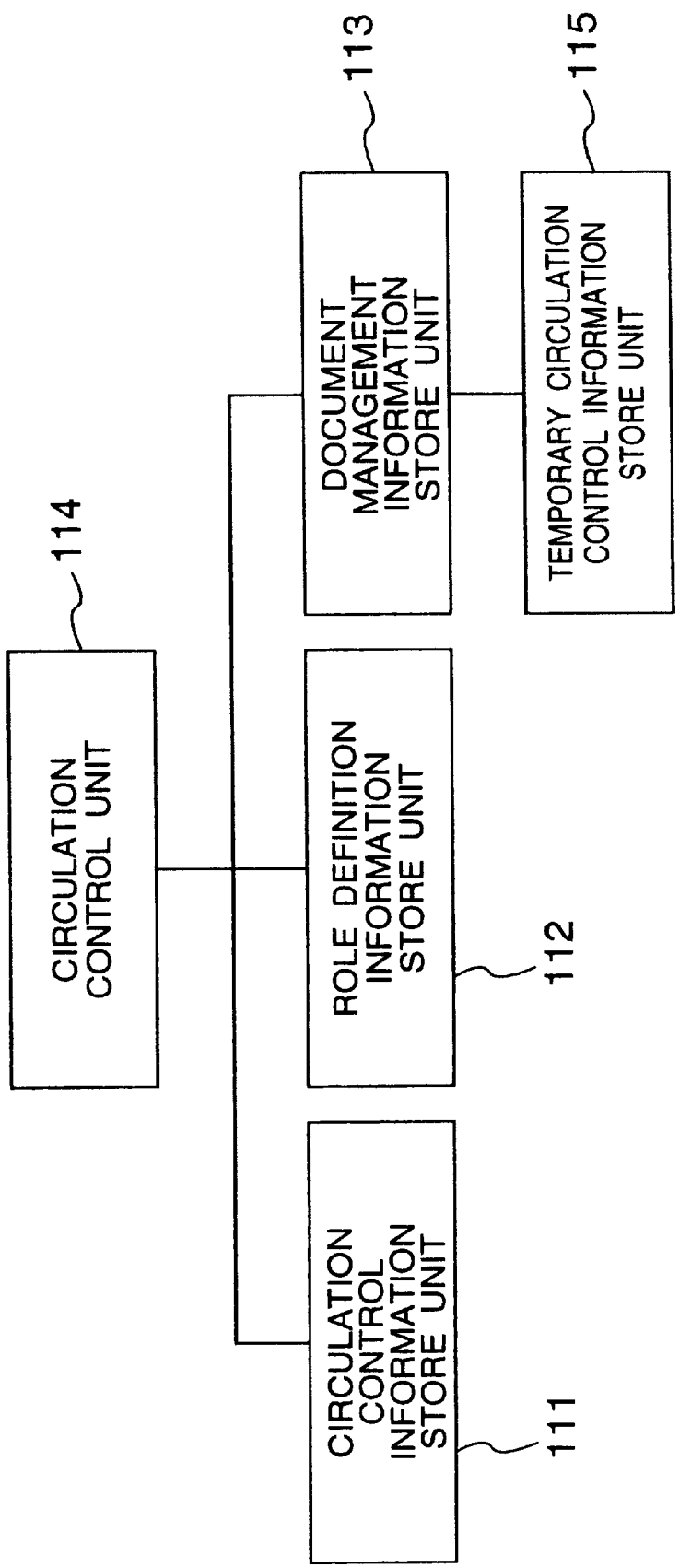

| DOCUMENT MANAGEMENT INFORMATION IDENTIFIER | CIRCULATED USER LIST | NODE IDENTIFIER | ROLE IDENTIFIER | USER IDENTIFIER | DOCUMENT LIST | POINTER TO TEMPORARY CIRCULATION CONTROL INFORMATION | ARBITRARY ATTRIBUTE (EXAMINATION) | ARBITRARY ATTRIBUTE (APPROVAL) | CIRCULATION CONTROL INFORMATION IDENTIFIER |
|---|---|---|---|---|---|---|---|---|---|
| C0000048 | | NODE 2 | C0000020 | C0000027 | | | | | C0000008 |
| C0000055 | | NODE 2 | C0000020 | C0000027 | | | | | C0000008 |

122

| CONSULTING USER IDENTIFIER | CONSULTED USER IDENTIFIER |
|---|---|
| C0000027 | C0000026 |
| C0000026 | C0000028 |

| ROLE INFORMATION IDENTIFIER | ROLE NAME | LIST OF UNPROCESSED DOCUMENTS | WORKING ATTRIBUTE |
|---|---|---|---|
| C0000015 | PREPA-RATION | | WORKING POSSIBLE |
| C0000020 | EXAMI-NATION | | WORKING POSSIBLE |
| C0000021 | AP-PROVAL | | WORKING IMPOSSIBLE |

142 —

| USER INFORMATION IDENTIFIER | USER NAME | USER TYPE | LIST OF UNPROCESSED DOCUMENTS | WORKING ATTRIBUTE |
|---|---|---|---|---|
| C0000025 | kawasaki | MANAGER | | WORKING POSSIBLE |
| C0000026 | yamada | COMMON USER | | WORKING POSSIBLE |
| C0000027 | tanaka | COMMON USER | | WORKING IMPOSSIBLE |

143 —

| ROLE INFORMATION IDENTIFIER | USER INFORMATION IDENTIFIER | WORKING ATTRIBUTE |
|---|---|---|
| C0000015 | C0000026 | WORKING POSSIBLE |
| C0000015 | C0000027 | WORKING IMPOSSIBLE |
| C0000021 | C0000027 | WORKING POSSIBLE |

ELECTRONIC DOCUMENT CIRCULATING SYSTEM

This is a continuation of application Ser. No. 09/124,235, filed Jul. 29, 1998, now U.S. Pat. No. 6,279,031; which is a continuation of Ser. No. 08/978,140, filed Nov. 25, 1997, now U.S. Pat. No. 5,848,248; which is a continuation of application Ser. No. 08/531,620, filed Sep. 21, 1995, now abandoned; which relates to a publication Ser. No. 08/531,652, filed Sep. 21, 1995, now U.S. Pat. No. 5,940,829, and application Ser. No. 08/531,401, filed Sep. 21, 1995, now U.S. Pat. No. 5,767,847, the disclosures of which are incorporated herein by reference.

BACKGROUND OF THE INVENTION

This invention relates to an electronic document circulating system and more particularly to an electronic document circulating system utilizing a communication management system and a file sharing system in a network system.

Heretofore, as the electronic document circulating system can utilize any document, a circular route or path of a document is defined in order of duties such as "preparation", "examination", and "approval" and a plurality of users who perform operations corresponding to the "preparation", the "examination and the "approval" are previously defined in a duty table separately from the definition of the circular route. For example, JP-A-2-278458 discloses an electronic document circulating system in which when a document is to be transmitted to a user who performs an operation corresponding to the "examination", a transmitting person or a transmitter changes a designation of a user at a transmission destination if necessary on the basis of a list of users at circular destinations automatically determined in accordance with a previously defined decision rule of circular destination and the user then responds to a system to thereby complete the transmission of the document to the user. The decision rule of circular destination is information capable of changing the designation of the user at the circular destination in accordance with an amount of money for a contract in the document and of deciding a user having an identifier in the duty table coincident with a kind of the document and a preparing person's post as a user at a circular destination.

The prior art does not consider the case where the transmitter is not required to confirm the designation of the user at a transmission destination upon transmission of a document particularly, the case where there is no necessity that the user at a transmission destination is uniquely limited and the like as in the case where any user may be applied as far as the user at the transmission destination is a user who performs the process corresponding to the same duty. For example, it is assumed that the assessment work of contract that several thousands of contract documents must be assessed in a day is performed smoothly. In this case, if an amount of contract documents assessable by one person in a day is assumed to be several hundreds of cases, ten persons who have the equal power and can perform the equal assessment are required. In this case, the transmitter who has prepared the contract document to be assessed by the assessment person is not required to confirm who is an assessment person at the transmission destination of the contract document. In the prior art, however, the transmitter had to assign the assessment work to ten persons in accordance with the number described in the document so that the user at the circular destination could decide uniquely by using the decision rule of circular destination. Accordingly, there was a problem that it took time to prepare such a decision rule of circular destination and the transmitter had to confirm the designation of the user at the transmission destination unnecessarily.

Further, when the transmitter changed the designation of the user at the transmission designation, the transmitter could not understood the allocation and the burden to the user at the transmission destination of the transmitted documents. Further, there was a problem that when the transmitter wanted to transmit the document again to the user at the transmission destination who took charge of treatment of the document before, the transmitter had to change the designation of the user at the transmission destination after confirmation of the user's history indicating whether the user made the treatment or not.

Further, when the transmitter was to consult with another user who was not contained in the circular list during circulation of a document, it was necessary to perform the complicated designation that the user to be consulted was inserted into a list of the transmission destination of the document and the transmitter himself was inserted into the list so as to return the document to the transmitter again. In addition, there was a possibility that when the user to be consulted was empowered to change the transmission destination in the circular list, the designation was changed so that the transmitted document was not returned to the transmitter himself.

Furthermore, there was a problem that the transmitter had to necessarily define a proxy in the case where the document could not be treated by reason that the user at the transmission destination was absent.

SUMMARY OF THE INVENTION

Accordingly, it is an object of the present invention to solve the above problems by providing an electronic document circulating system capable of attaining simplification of the operation procedure by a transmitting person and facilitation of the temporary circulation of a document.

The electronic document circulating system according to the present invention are characterized as follows:

(1) When a transmitting person does not confirm the designation of a user at a transmission destination upon transmission of a circular document, one specific user at the transmission destination is decided automatically in accordance with previously defined circulation control information.

(2) In the above item (1), one specific user at the transmission destination is decided automatically in accordance with a predetermined selection criterion or a transmission history.

(3) Without confirmation of the designation of the user at the transmission destination by the transmitting person, the circular document transmitted to a role (described later) is transmitted in response to a reception request from any user belonging to the role, to the user issuing the reception request.

(4) When a certain user consults with another user about the circular document, temporary circulation is made to a consulted user. Thereafter, the circulation is returned to the previously defined original circular route and the normal circulation of the circular document is made.

(5) The user at the transmission destination of the circular document is selected properly in accordance with the working state set individually to the role or the user.

[1] In order to achieve the above object, the electronic document circulating system of the present invention for circulating an electronic circular document by means of a plurality of computer terminals interconnected through a network, comprises a circulation control information store unit for previously storing circulation control information for specifying a circular route of the circular document, a role definition information store unit for storing role definition information for defining a role for managing the circular document transmitted to any of equal users, and a circulation control unit for circulating a designated circular document in accordance with the circular route on the basis of contents of the circulation control information store unit and the role definition information store unit.

[2] In the above item [1], when the circular document has been transmitted to a certain role, the circulation control unit transmits the circular document to a specific user selected from the role on the basis of a predetermined selection criterion of the user at the transmission destination.

[3] In the above item [1], when the circular document has been transmitted to a role from a user who does not belong to the role or when an unprocessed circular document has been transmitted to a role from a user belonging to the role, the circulation control unit informs all users belonging to the role of the incoming of the circular document. The circulation control unit transmits the circular document in response to a reception request of the circular document from any user belonging to the role, to the user.

[4] In any of the above items [1] to [3], there is further provided a temporary circulation control information store unit for storing temporary circulation control information for specifying a temporary circular route. When the temporary circular route is designated during circulation of the circular document, the circulation control unit circulates the circular document in accordance with the temporary circular route on the basis of contents of the temporary circulation control information store unit and the role definition information store unit. Thereafter, the circulation control unit circulates the circular document in accordance with the original circular route on the basis of contents of the circulation control information store unit and the role definition information store unit.

(1) In the electronic document circulating system of the present invention, by designating the role as the transmission destination, the transmitting person of the document is not required to confirm or modify the designation of a specific user at the transmission destination, so that the operation procedure of the transmitting person concerning the transmission of the document can be simplified.

(2) In the above item (1), the circulation control unit can designate an equal user at the transmission destination belonging to the role so that the allocation rate or burden defined by the predetermined selection criterion of the user at the transmission destination is attained. Consequently, the operation procedure of the transmitting person relative to the transmission of the document can be simplified and the optimum of the whole processing efficiency including the circulation of the document can be attained.

(3) In the above item (1), the circulation control unit enables each user belonging to a role to select any document in accordance with the user's own ability or burden from the documents transmitted to the role. Consequently, simplification of the operation procedure of the transmitting person relative to the transmission of the document and the optimum of the whole processing efficiency including the circulation of the document can be attained.

(4) In any of the above items (1) to (3), with the temporary circulation control information store unit for storing temporary circulation control information for specifying a temporary circular route, the temporary circular route is designated without modification of the original circular route and the circular document is transmitted to any user. After consultation or questions and answers to the user, the circular document can be returned to the original circular route exactly and accordingly the processing quality can be improved without reduction of the whole processing efficiency including the circulation of the document.

BRIEF DESCRIPTION OF THE DRAWINGS

FIG. 1 is a schematic diagram illustrating an example of a network system to which the electronic document circulating system of the present invention is applied;

FIG. 2 is a block diagram schematically illustrating the functional configuration of embodiments of the electronic document circulating system according the present invention;

FIG. 3 is a flow chart showing operation attending on a request of starting the circulation of a document from a client in a first embodiment of the electronic document circulating system of the present invention;

FIG. 4 is a flow chart showing operation of the document transmission process in the first embodiment of the electronic document circulating system of the present invention;

FIG. 5 is a flow chart showing operation of the document transmission request in the first embodiment of the electronic document circulating system of the present invention;

FIG. 6 shows an example of information stored in a circular information store unit in the first embodiment of the electronic document circulating system of the present invention;

FIG. 7 shows an example of information stored in a role definition information store unit in the first embodiment of the electronic document circulating system of the present invention;

FIG. 12 is a block diagram schematically illustrating the functional configuration of a third embodiment of the electronic document circulating system of the present invention;

FIG. 13 shows an example of information stored in a document management information store unit and a temporary circulation control information store unit in the third embodiment of the electronic document circulating system of the present invention;

FIG. 15 shows an example of information stored in a role definition information store unit in the fourth embodiment of the electronic document circulating system of the present information.

DESCRIPTION OF THE PREFERRED EMBODIMENT

Figure 8:
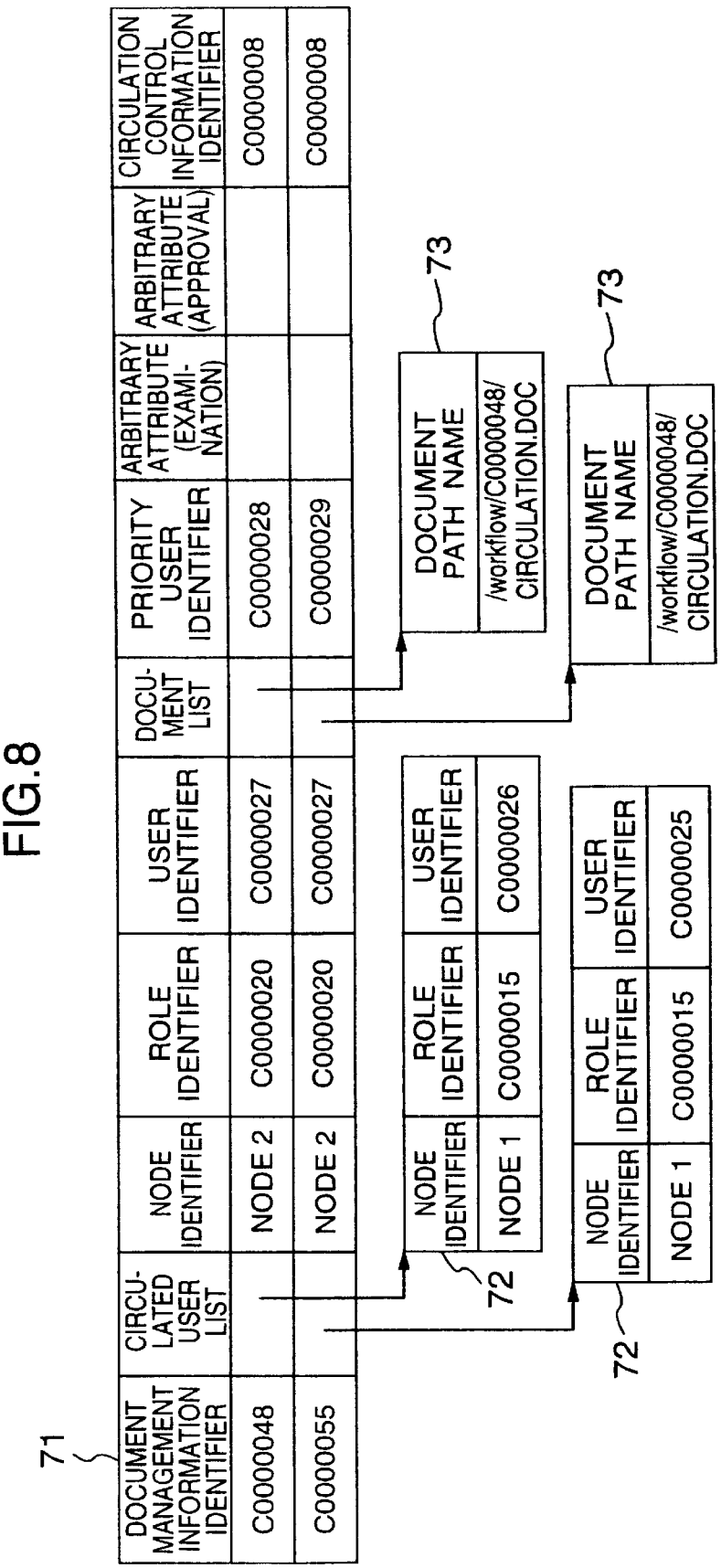
FIG. 8 shows an example of information stored in a document management information store unit in the first embodiment of the electronic document circulating system of the present invention.

First of all, an electronic document circulating system of the present invention is described generally. FIG. 1 is a schematic diagram illustrating an example of a network system to which the electronic document circulating system of the present invention is applied. In FIG. 1, a server machine 1 is connected to a plurality of client machines 2a to 2d through a network 3. Stored in the server machine 1 is a server program 5 for implementing the function of the server machine. Further, the server machine 1 is connected to a database 6. Similarly, stored in the client machines 2a to 2d are client programs 5a to 5d for implementing the functions of the client machines, respectively. Users 4a to 4d can utilize the client machines 2a to 2d, respectively, to transmit and receive a circular document among the users.

In FIG. 1, only four client machines are shown in order to describe the configuration simply, while a multiplicity of client machines are connected through the network actually. Further, only one network 3 is also shown but the users may be connected through a plurality of networks to each other.

The electronic document circulating system according to the first embodiment of the present invention basically includes a circulation control information store unit in which circulation control information for designating a circular route or path of an electronic circular document is previously stored, a role definition information store unit in which role definition information for relating a document receiving tray (hereinafter referred to as "role") shared by a plurality of equal users who perform the same duty to the plurality of users who share the role is previously stored, and a circulation control unit for transmitting the circular document to a next transmission destination determined on the basis of the circulation control information and the role definition information.

When the user starts the circulation of a specific document, the user prepares a document body and designates a definition name of a circular route and a circulation start node (the user's own node) to issue a circulation start request. When the circulation control unit receives the circulation start request from the user (client), the circulation control unit prepares document management information corresponding to the document body. The circular document is constituted by the document body and the document management information. The document management information includes an identifier of the circulation control information (for designating any of a plurality of types of previously defined circulation control information (routes) to perform the circulation on the basis of the designated route), an identifier of a circulation start node (for designating a position (hereinafter referred to as a "node") in a circular route from which the circulation is started), a circulation start role name, and an identifier of a circulation start user (that is, the user requesting the circulation). Further, as described later, a column for the node identifier, the role identifier and the user identifier is rewritten by the circulation control unit during the circulation.

The circulation control information includes a selection criterion for selecting a user at a transmission destination of the circular document from the users belonging to the role in the circulation control information. The circulation control information is prepared by the user into a text format by means of a text editor and is then registered into the circulation control information store unit by means of exclusive registration means in the electronic document circulating system.

An allocation rate for each user in each role can be defined in the role definition information. The role information, the user information and the related information of the role and the user are stored in the role definition information store unit into a table format by means of exclusive registration means provided by the function and the GUI (Graphical User Interface).

The circulation control information includes the role name of the transmission destination, the selection criterion of the user at the transmission destination and the node identifier of a next transmission destination from the circulation control unit in each node in the circulation control information. Further, when the "sequence" described later is designated as the selection criterion, the node information includes the identifier of the user who is the transmission destination from the circulation control unit in the circular document in the node at the last time. In addition, the user may prepare the document body by using a software of wordprocessors, a table calculation software, an image data preparing software and the like.

When the circulation control unit receives a transmission request from the user to a next node, the circulation control unit acquires the circulation control information specified by the identifier of the circulation control information set in the document management information constituting the circular document and retrieves the node information specified by the node identifier set in the document management information from the circulation control information. The circulation control unit then acquires a node identifier of a next transmission destination set in the node information and retrieves the node information specified by the next node identifier from the circulation control information. Finally, the circulation control unit acquires the role name of the transmission destination and the selection criterion of the user at the transmission destination from the next node information retrieved above. Thereafter, the role definition information specified by the role name is retrieved from the role definition information store unit and a list of users related to the role is acquired. One user at the transmission destination is selected from the list of users on the basis of the selection criterion of the user at the transmission destination.

There are six kinds of selection criteria of the user at the transmission destination as follows:

| | |
|---|---|
| (1) | Random |
| (2) | Sequence |
| (3) | Allocation Rate |
| (4) | Burden |
| (5) | Recursive |
| (6) | Priority Order |

As described above, the circulation control unit selects the user at the transmission destination on the basis of the selection criterion of the user at the transmission destination set in the specified circulation control information and transmits the circular document to the user at the transmission destination. Thus, the identifier of the document management information constituting the circular document is added to a list of unprocessed documents in the user information specified by the identifier of the user at the transmission destination at the time of transmission. The circulation control unit deletes the identifier of the pertinent document management information from the list of unprocessed documents when the user at the transmission destination completes the process of the transmitted circular document and requests the circulation control unit to perform transmission to a next user or to complete the circulation.

In a second embodiment of the electronic document circulating system of the present invention, the node information of the transmission destination which the circulation control unit refers to includes a role name of a transmission destination (that is, the designation which does not use the transmission to a specific user in the role) in the same manner as in the first embodiment. In addition, the identifier of the document management information constituting the unprocessed circular document transmitted to the role is set in the list of unprocessed documents in the role information. Thus, any user in the role can take out and process the unprocessed circular documents in the role. Further, set in the user information is a user's authority attribute indicating whether the user is a system manager or a common user.

The circulation control unit retrieves the role definition information having the coincident role name from the role definition information store unit and adds the identifier of the document management information to the list of unprocessed documents of the role definition information. When any user belonging to the role requests to take out the unprocessed document from the role, the circulation control unit deletes the identifier of the document management information from the list of unprocessed documents in the role definition information and adds the identifier of the document management information to the list of unprocessed documents in the user information about the user in the role who has performed the request. Further, when the user requests to return the circular document to the role, the circulation control unit deletes the identifier of the document management information from the list of unprocessed documents in the user information about the user who has performed the request and acquires the role name in the document management information of the circular document. Then, the circulation control unit adds the document management information to the list of unprocessed documents of the role definition information having the coincident role name.

Further, a user who can take out an unprocessed circular document from a role is only a user belonging to the role and a user who can return the Circular document to the role is only a user having the circular document registered in the list of unprocessed documents. However, the user having the authority of the system manager can return the unprocessed document of another user to the role and take out the unprocessed document from the role to transmit it to any user belonging to the role. In this case, whether the user has the authority of the system manager or not is examined by the attribute of the user's authority in the user information described above.

In a third embodiment of the electronic document circulating system of the present invention, when a user A requests to consult with another user B about a circular document, the circulation control unit adds the identifier of the consulting user A and the identifier of the user B to be consulted to a list of consulting persons in the document management information constituting the circular document as a set of identifiers. Thereafter, the identifier of the document management information is deleted from the list of unprocessed documents of the user information about the requesting user A and the identifier of the document management information is added to the list of unprocessed documents of the user information about the user B to be consulted. Further, when the user B requests to consult with another user C, the circulation control unit adds the identifier of the consulting user B and the identifier of the user C to be consulted to the list of consulting persons in the document management information constituting the circular document as a set of identifiers in the same manner as above. Thereafter, the identifier of the document management information is deleted from the list of unprocessed documents of the user information about the requesting user B and the identifier of the document management information is added to the list of unprocessed documents of the user information about the user C to be consulted. When the user C completes the process and further does not consult with another user, the circulation control unit deletes the finally registered set of identifiers of the consulting user B and the user C to be consulted from the list of consulting persons of the document management information. Thereafter, the identifier of the document management information is deleted from the list of unprocessed documents of the user information about the user C to be consulted and the identifier of the document management information is added to the list of unprocessed documents of the user information coincident with the identifier of the consulting user. The same process is performed for the consulted user B by the consulting user A. As described above, after the identifiers of the consulting user and the consulted user first registered in the list of consulting persons are deleted, the circular document is returned to the user A (first consulting user) of the first designated circular route. Thereafter, the circular document is circulated in accordance with the first circular route.

In a fourth embodiment of the electronic document circulating system of the present invention, a working attribute can be set to each of the user information, the role definition information and the information for relating the role to the user. The common user can modify only the user's own working attribute and the user having the manager's authority of the above system can modify all of the user's working attributes. When the user is designated as a user at the transmission destination of the circular document, the circulation control unit refers to the working attribute set in the user information about the user. As the result of the reference, when it is possible to work, the circular document is transmitted to the user and when it is impossible to work, the circular document is not transmitted. When the role is designated as a transmission destination of the circular document and there is a definition for automatically transmitting the circular document to a user in the role, the circulation control unit refers to the working attribute set in the role definition information. As the result of the reference, when it is possible to work, a user at a transmission destination is decided in accordance with the predetermined selection criterion of the user at the transmission destination and when it is impossible to work, transmission to the user is not made. At this time, the circulation control unit refers to both of the working attribute set in the information for relating the role to the user and the working attribute set in the user information. As the result of the reference, the user having the working attribute indicating that working is possible is selected as the user at the transmission destination in both cases, and when there is no user having the working attribute indicating that working is possible in both cases, transmission to the user is not made. Further, the process corresponding to "transmission is not made" is assumed to be the process that the document management information constituting the circular document is deleted from the list of unprocessed documents in the user information about the user at the transmission destination and is added to the list of unprocessed documents of the user information about the system manager.

The system manager has the authority to modify the working attribute about all users and transmit the document to any node of the circular route. Further, as another processing method, a processing method in which registration of the circular document is left in the list of unprocessed documents in the user information about the user at the transmission request destination or a processing method in which the circular document is added to the list of unprocessed documents in the role definition information or the user information at the transmission destination but the process to the circular document is suppressed until the state that the working is possible is reestablished may be adopted.

The embodiments of the electronic document circulating system of the present invention are now described in detail with reference to the accompanying drawings.

FIG. 2 is a block diagram schematically illustrating the functional configuration of the first embodiment of the electronic document circulating system of the present invention. In FIG. 2, a circulation control information store unit 11 in which circulation control information for controlling which user receives an electronic circular document and to which user the received document is transmitted is previously stored, a role definition information store unit 12 in which the role definition information for relating a role to a plurality of users is previously stored, and a document management information store unit 13 in which the document management information for managing a document to be circulated is stored are connected to a circulation control unit 14 which refers to the circulation control information and the role definition information to decide a next transmission destination and transmit the circular document. The circulation control information store unit 11, the role definition information store unit 12 and the document management information store unit 13 are provided in a database such as, for example the database 6 which the server machine 1 can refer to. However, the store units 11 to 13 may be provided in the server machine 1 logically and may be provided in a disk device of any machine of the network 3 physically. Further, the circulation control unit 14 of FIG. 2 is included in the server program 5.

FIG. 3 is a flow chart showing operation attending on a request of starting the circulation of a document from a client in the first embodiment of the electronic document circulating system of the present invention. In FIG. 3, when the user requires logging-in to the electronic document circulating system from a related client (step 21), the circulation control unit of the client informs the circulation control unit 14 of a server of the logging-in by utilizing the communication management system (step 22). At the subsequent step 23, the circulation control unit 14 of the server starts a child-process for processing the requirement from the client. At this time, the child-process retrieves the user information of the requiring user from the user information of the role definition information store unit 12 and when the pertinent user information is not detected, it is assumed that there is no authority of utilization and the logging-in is rejected. On the other hand, when the pertinent user information is detected, the relation information having the identifier coincident with the user information identifier of the requiring user is retrieved from the relation information between the role information and the user information of the role definition information store unit 12 and the retrieved relation information is stored in a memory. Thereafter, all requirements from the requiring client are informed to the child-process of the circulation control unit 14 of the server and are processed in the child-process.

When the user requires the list of the circulation control information in which the user himself is included in the circular route, of the previously defined circulation control information (step 24), the child-process of the circulation control unit 14 of the server retrieves the relation information coincident with the identifier of the user information of the requiring user from the relation information previously defined between the user information of the role definition information store unit 12 and the circulation control information of the circulation control information store unit 11. Further, the relation information coincident with the identifier of the role information of the role belonging to the requiring role is retrieved from the relation information previously defined between the circulation control information and the role information of the role definition information store unit 12, so that the relation information is returned to the user as the list of the circulation control information in which the user is included in the circular route (step 25).

When the user selects one of the circulation control information and requires the list of nodes in which the circulation can be started (step 26), the child-process of the circulation control unit 14 of the server retrieves the node information in which the processing person in the node information is coincident with the role name or the user name of the requiring user and having the node attribute in which the circulation can be started, from the node information in the circulation control information and returns it to the user as the list of nodes in which the circulation can be started (step 27).

Finally, the identifier of the circulation control information, the identifier of the circulation start node information (to which the user himself belongs) and a path name of the previously prepared document are designated and the user requires to start the circulation of the document (step 28). At the subsequent step 29, the circulation control unit of the client transfers the designated document to the server. The child-process of the circulation control unit 14 of the server inputs the circulation control information coincident with the identifier of the designated circulation control information from the circulation control information store unit 11. Then, the node information coincident with the identifier of the circulation start node is inputted from the circulation control information and it is confirmed from this node information that the user can prepare the document at the circulation start node. The circulation control unit 14 prepares document management information to set the path name of the document on the server to the document management information and sets the identifier of the designated circulation control information, the identifier of the circulation start user information and the identifier of the circulation start node information to the document management information. Thereafter, the circulation control unit 14 adds the identifier of the document management information to a transmission request queue.

With the above processing operation, the operation of starting the circulation of the document from the client to the server is completed. The user requiring starting of the circulation prepares the circular document.

FIG. 4 is a flow chart showing operation of a transmission process of the document after the user has prepared or processed the document in the first embodiment of the electronic document circulating system of the present invention. In FIG. 4, when a daemon of the circulation control unit 14 which continues to operate on the server machine so that the daemon can always receive a request from the client receives the identifier of the document management information from the transmission request queue (step 31), the daemon receives the document management information coincident with the identifier. Thus, the daemon receives the circulation control information coincident with the identifier of the circulation control information in the document management information from the circulation control information store unit 11 (step 32). The daemon of the circulation control unit 14 retrieves the node information coincident with the identifier of the node information in the document management information from the circulation control information and acquires the identifier of the node information of a next node constituting the transmission destination (step 33). The daemon of the circulation control unit 14 retrieves the next node information from the circulation control information and acquires a selection method of a next role name of the transmission destination and a user in the role (step 34). In the subsequent step 35, the daemon of the circuit control unit 14 receives the role information coincident with the role name from the role definition information store unit 12 and retrieves the list of users related to the role information from the relation information between the role information and the user information.

At step 36, the daemon of the circuit control unit 14 selects one of the user information from the list of users in accordance with the selection method (user selection criterion) acquired at step 34 as follows:

(1) When the "Random" is acquired as the selection method:

The circulation control unit 14 selects one of user information from the list of users at random.

(2) When the "Sequence" is acquired as the selection method:

The circuit control unit 14 acquires the identifier of the user information corresponding to the user (the user at the transmission destination at the last time) to whom the circular document has been transmitted from the circulation control unit at the node at the last time from the node information received at step 34. Thereafter, the identifier of the user at the transmission destination at the last time is retrieved from the list of users and the user information corresponding to the user registered next to the user at the transmission destination at the last time in the list is selected as the user at the transmission destination. Further, the identifier of the selected user information is set in the node information received in step 34.

(3) When the "Allocation Rate" is acquired as the selection method:

The circulation control unit 14 selects one of the user information in accordance with the randomization weighted on the basis of the allocation rate previously defined in the attribute of the relation information of the role and the user from the list of users.

(4) When the "Burden" is acquired as the selection method:

The circulation control unit 14 receives the user information in the list of users successively and acquires the number of unprocessed documents of each user in the role. Then, the circulation control unit calculates the burden on each user in accordance with the equation of (the number of unprocessed documents)÷(the sum total of unprocessed documents)×100. Then, a burden value previously set in the attribute of the relation information of the role and the user is subtracted from the burden value obtained by the above calculation and the user information having the difference thereof being maximum is selected.

(5) When the "Recursive" is acquired as the selection method:

The circulation control unit 14 acquires the identifier of the user processed before in the role from the document management information and selects the user information coincident with the identifier of the user processed just before in the role from the list of users.

(As other selection methods, there are a method in which when transmission is made to the same node at and after the second time, the user processed before in the node is selected, a method in which when a group is defined as the recursive definition of the node of the circulation control unit 14, the circulation control unit 14 records an identifier of the group or the node identifier in the document management information upon transmission of the document and acquires the user processed before in the node having the same group identifier in the node of the recursive designation to select the user, and the like.)

(6) When the "Priority Order" is acquired as the selection method:

The circulation control unit 14 acquires the identifier of the user (user at the transmission destination with priority) to which the document is to be transmitted by priority from the document management information and then selects the user coincident with the identifier from the list of users. The identifier of the user at the transmission destination with priority is set by the circulation control unit 14 when a transmitting person of a document previously requires setting of the name of the user at the transmission destination with priority.

Finally, after the daemon of the circulation control unit 14 sets the identifier of the selected user information, the identifier of the role and the identifier of the next node to the document management information, the daemon of the circulation control unit 14 sets the identifier of the document management information to the list of unprocessed documents of the user information and deletes the document management information from the transmission request queue (step 37).

Thereafter, the processings of steps 31 to 37 are repeated until the transmission request queue is reduced to zero and the transmission request queue is then monitored at intervals of one second, for example.

With the above processing operation, the operation of the document transmission processing is completed.

FIG. 5 is a flow chart showing the operation in case where a user requires to transmit the user's own unprocessed document in the first embodiment of the electronic document circulating system of the present invention. In FIG. 5, at a first step 41, the user performs logging-in to the electronic document circulating system from the client (the logging-in processing is the same as that at steps 21 to 23 of FIG. 3 and description thereof is omitted). When the user requires to acquire the list of unprocessed documents (step 42), the child-process of the circulation control unit 14 of the server acquires the list of unprocessed documents of the user information coincident with the identifier of the requiring user from the role definition information store unit 12 and returns it to the user (step 43).

Next, when the user selects one document from the list of unprocessed documents and requires to acquire the document (step 44), the child-process of the circulation control unit 14 of the server receives the document management information coincident with the identifier of the selected document management information from the document management information store unit 13 and acquires the path name of the selected document in the server to return it to the user (step 45). It is assumed that the document in the server exists in the directory defined by the client side as a network drive and the user can refer to the document directly from the client. Further, there is another method in which the selected document is copied to the network drive which the user can refer to and the path thereof is returned while the user cannot refer to the path of the document in the server directly.

Finally, when the user requires transmission after the user refers to the document designated by the above route and performs the necessary process (step 46), the child-process of the circulation control unit 14 of the server deletes the identifier of the document management information from the list of unprocessed documents of the user information and adds the identifier of the document management information to the transmission request queue (step 47).

With the above processing operation, the operation of requiring to transmit the unprocessed document is completed.

FIG. 6 shows an example of information stored in the circulation control information store unit 11 in the first embodiment of the electronic document circulating system of the present invention.

As shown in FIG. 6, the circulation control information 51 includes an identifier "C0000008" peculiar to the circulation control information. In the circulation control information, the node information having the node identifiers of "node 1", "node 2" and "node 3" is stored in a node information list 52. The role name of "preparation" and the node type of "start of circulation" are stored for the "node 1", the role name of "examination" and the node type of "processing" for in the "node 2" and the role name of "approval" and the node type of "processing" for the "node 3". When a user name is defined in the node, the user name is stored in the column of the user name. The node information of each node includes the user information identifier attribute in which an identifier of the user to which the document has been transmitted from the circulation control unit at this node at the last time.

The circulation control information 51 includes a path name of the circulation information file 53. Stored in the circulation information file is all of circulation control information (information which is a source of the above node information, the definition of the circulation route, the update instruction of the attribute in the document management information, information indicative of a branch at the circulation route by reference of the attribute in the document management information) defined previously by using a text editor or the like. For example, in FIG. 6, as the section method of the user at the transmission destination, "recursive ("#autodeliver #recursive group 1")", "random (#autodeliver #random")", and "sequence ("#autodeliver #sequence")" are defined in the nodes 1, 2 and 3, respectively. While not shown, the same definition may be made for the "allocation", the "burden" and the "priority order". The "group 1" added to the definition of the "recursive" is a group identifier for defining the node group. For example, in FIG. 6, the definition of the "group 1" may be removed, while the group identifier serves to make it possible to perform recursion of the user between roles having different role names of other nodes and not to perform recursion of any node of a plurality of nodes having the same role name defined in the circulation route. In other words, the circulation control unit 14 records the group identifier or the node identifier in the document management information upon transmission of the document, so that the circulation control unit 14 acquires and selects the user processed before in the node having the same group identifier in the node where the recursion is designated. For example, in FIG. 6, when the portion of "#role role name" is changed to "#user user name", transmission is made to the designated user instead of transmission to any user in the role.

The format of the circulation information file 53 is assumed to be changed to a text format or a table format which is easily utilized from a program. Further, the information except the attribute information for setting the identifier of the user information transmitted at the node at the last time in the node information is the same as that included in the circulation information file 53. Accordingly, the information is sufficiently useful if it is stored in any of the node information list 52 or the circulation information file 53. In the example of FIG. 6, the information which only the daemon of the circulation control unit 14 refers to, such as the selection method of the user in the role, is stored in the circulation information file 53 and the node identifier, the role name and the user name which the client refers to and requires are stored in the node information list 52 to thereby attain the high-speed response to the client.

FIG. 7 shows an example of the information stored in the role definition information store unit 12 in the first embodiment of the electronic document circulating system of the present invention.

As shown in FIG. 7, the role definition information includes a role table 61, a user table 62 and a relation table 64 of users belonging to roles. The role table 61 includes role identifiers "C0000015, "C0000020" and "C0000021" and role names of "preparation", "examination" and "approval" are stored in the respective role identifiers. The user table 62 includes user identifiers "C0000025", "C0000026", "C0000027", "C0000028" and "C0000029" and user names of "kawasaki", "itou", "yamada", "maeda" and "tanaka" are stored in the respective user identifiers. A list 63 of identifiers of the document management information type of the unprocessed documents is stored in each of user identifier. The relation table 64 of the roles and the users belonging to the roles includes sets of the above role identifiers and user identifiers and further includes the attributes of the allocation rate and the burden. Further, there are provided a relation table 65 between the roles and the circulation information and a relation table 66 between the user information and the circulation information. The role definition information provides the function or the GUI to input the role name, the user name and the relation of the roles and the users of the role definition information store unit and store them in the role definition information store unit 12.

FIG. 8 shows an example of information stored in the document management information store unit in the first embodiment of the electronic document circulating system of the present invention.

As shown in FIG. 8, a document management information table 71 includes identifiers "C0000048" and "C0000055" of the document management information and stores a list 73 of path names of the document file, identifier of current node information, current role identifier, current user identifier, identifier of user information to be transmitted by priority, a list 72 of sets of circulated node information identifier, role information identifier and user information identifier, and other arbitrary attribute in the respective identifiers of the document management information. The arbitrary attribute thereof is defined in the circulation control unit and is added by the circulation control unit 14 upon preparation of the document management information and for example can be used to set the condition upon branch of the circulation route or to set information which the user wants to deliver during the circulation except the document. Further, the list of circulated nodes, roles and users is used upon the above "recursion". The history information can be used instead of the above information, while when the above information is utilized for only the "recursion", the previous information can be superscribed upon transmission to the same node at and after the second time to thereby reduce an amount of information to be stored. Further, information for the "recursion" can be constituted by only the node and the user, only the node group and the user, and only the role and the user to thereby reduce an amount of information.

As described above, according to the embodiment, since the user at the transmission destination can be automatically decided by the system in accordance with the previously defined circulation control information at the previously defined burden or rate or in accordance with the selected designation of the user who has processed the circular document before without confirmation of a specific user at the transmission destination by the transmitting person, the operation procedure of the transmitting person relative to the transmission of document can be simplified.

Figure 9:
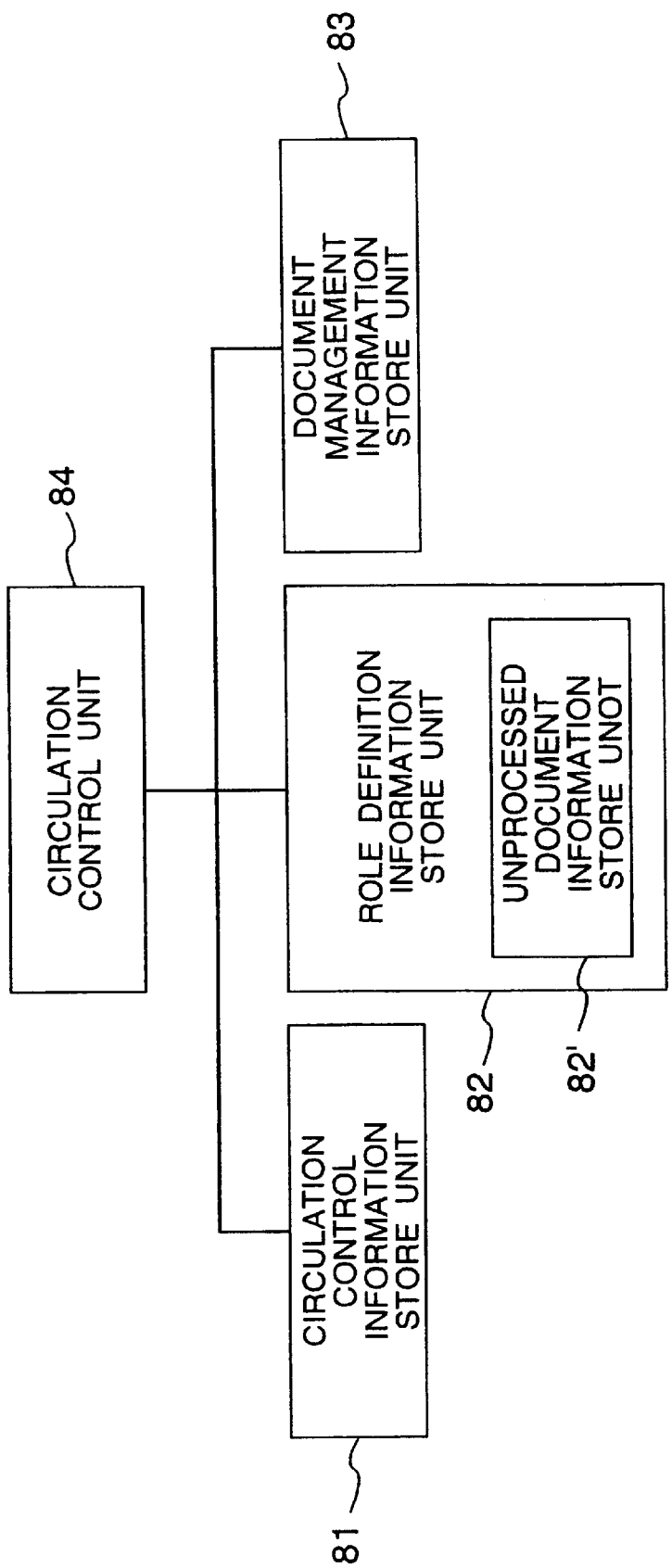
FIG. 9 is a block diagram schematically illustrating the functional configuration of a second embodiment of the electronic document circulating system of the present invention.

FIG. 9 is a block diagram schematically illustrating the functional configuration of a second embodiment of the electronic document circulating system of the present invention. In FIG. 9, a circulation control information store unit 81 in which circulation control information for controlling which user receives an electronic circular document and to which user the received document is transmitted is previously stored, a role definition information store unit 82 in which the role definition information for relating a role to a plurality of users is previously stored, and a document management information store unit 83 in which the document management information for managing a document to be circulated is stored are connected to a circulation control unit 84 which refers to the circulation control information and the role definition information to decide a next transmission destination and transmit the circular document. The configuration of FIG. 9 is different from that of FIG. 2 in that the role definition information store unit 82 includes an unprocessed document information store unit 82'.

The operation attending on a request of starting the circulation of a document from a client in this embodiment is the same as that shown in the flow chart of FIG. 3 and accordingly description thereof is omitted.

Operation of the document transmission processing after preparation of the document in this embodiment is now described.

The circulation control unit 84 receives an identifier of the document management information from the transmission request queue and then receives the circulation control information coincident with an identifier of the circulation control information in the document management information from the circulation control information store unit 81. The node information coincident with an identifier of the current node information in the document management information is retrieved from the circulation control information and an identifier of the next node information is acquired. Thereafter, the next node information is retrieved from the circulation control information to acquire the next role name (that is, this means the definition of the document in which a method for selecting a user in the role is not designated) of the transmission destination. Further, when the circulation control unit 84 receives the role definition information coincident with the next role name of the transmission destination from the role definition information store unit 82, the circulation control unit 84 sets the identification of the role and the identifier of the node relative to the role to the document management information. After the identifier of the document management information is set to the list of unprocessed documents of the role information, the document management information is deleted from the transmission request queue. Then, after the above process is repeated until the transmission request queue is reduced to zero, the transmission request queue is monitored at intervals of one second, for example. With the above processing operation, operation of the document transmission process is completed.

Operation responsive to the request of taking out the document in the role by the user (client) in this embodiment is now described.

When the user requires the list of roles from the related client, the circulation control unit 84 of the server receives the user information coincident with the identifier of the requiring user from the role definition information store unit 82. Thereafter, the list of role information relative to the user information is acquired by retrieving the relation information and the list is returned to the requiring user. Subsequently, when the user selects one of roles from the list of the role information and requires the list 92 of unprocessed documents in the role, the circulation control unit 84 of the server retrieves the designated role information and receives the list of unprocessed documents from the unprocessed document information store unit 82' to return the list of unprocessed documents to the user. Further, when the user selects one document from the list of unprocessed documents and requires to take out the document from the role, the circulation control unit 84 of the server deletes the identifier of the document management information corresponding to the selected document from the list of unprocessed documents of the role information and adds it to the list of unprocessed document of the user information. Thereafter, the name of the requiring user is set to the document management information. Finally, the user performs the acquirement request to the document taken out from the role. The operation corresponding to the acquirement request is the same as that of steps 44 to 47 in FIG. 5 and accordingly description thereof is omitted. With the above processing operation, the operation responsive to the request of taking out the document in the role by the client is completed.

There is a case where after the user has performed the request of taking out the document in the role, the document is not processed and is returned to the role due to any reason. Operation responsive to the request of returning the document in the role by the user (client) in this embodiment is now described.

When the user performs the request of returning the acquired document in the role without processing of the document, the circulation control unit 84 of the server receives the identifier of the role from the document management information of the designated document and deletes the identifier of the document management information from the list of unprocessed documents of the user information of the user who has returned the document to the role. Further, the circulation control unit 84 adds it to the list of unprocessed documents of the role information of the role and initializes the identifier of the user information of the document management information. With the above processing operation, the operation responsive to the request of returning the document to the role by the client is completed.

The configuration of the circular information stored in the circulation control information store unit 81 is the same as that of FIG. 6, while it is assumed that "no transmission to the user (#autodeliver #no)" is set as the selection method of the user in the circulation information file. Further, when "no transmission to the user and recursive ("autodeliver #no #recursive group 1)" is set the document can be transmitted by taking out by the user at the transmission destination at the first time of the node and can be transmitted directly to the user taken out at the first time at and after the second time.

Figure 10:
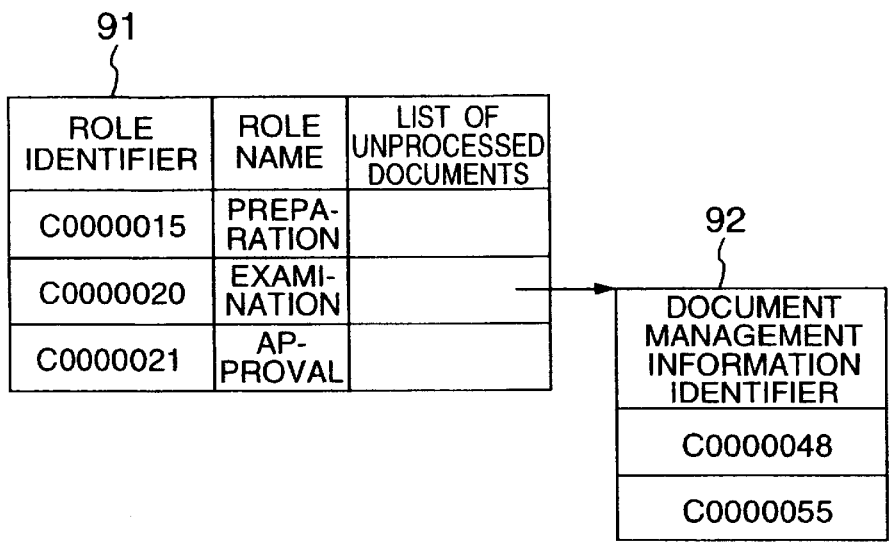
FIG. 10 shows an example of role information of role definition information stored in a role definition information store unit in the second embodiment of the electronic document circulating system of the present invention.

FIG. 10 shows an example of the role information of the role definition information stored in the role definition information store units 82 and 82' in the second embodiment of the electronic document circulating system of the present invention. As shown in FIG. 10, a role information table 91 includes role identifiers "C0000015", "C0000020" and "C0000021" and the role information having the role names of "preparation", "examination" and "approval" is stored in the respective role identifiers. A list 92 of identifiers of the document management information of unprocessed documents is stored in each of the role identifiers.

Figure 11:
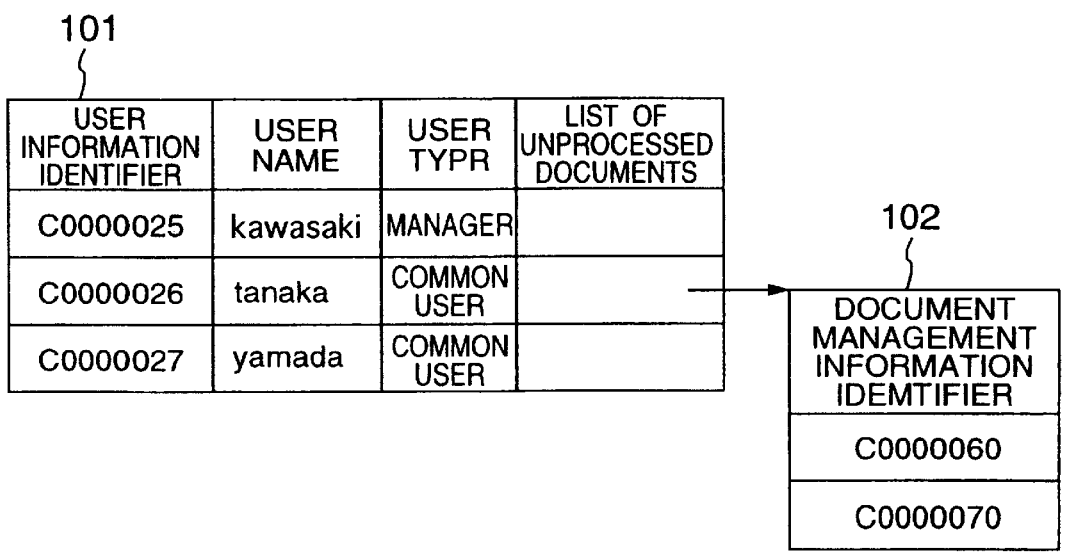
FIG. 11 shows an example of user information of the role definition information stored in the role definition information store unit in the second embodiment of the electronic document circulating system of the present information.

FIG. 11 shows an example of the user information of the role definition information stored in the role definition information store unit 82 in the second embodiment of the electronic document circulating system of the present invention. As shown in FIG. 11, the user information table 101 stores a user type for distinguishing whether the user is the system manager or the common user in addition to the user identifier, the user name and the list of identifiers of the document management information of unprocessed documents.

The other information stored in the role definition information store unit and the document management information stored in the document management information store unit have the same configuration as in the first embodiment.

As described above, according to the embodiment, the document is transmitted to the role in accordance with the previously defined circulation control information without confirming the user at the specific transmission destination by the transmitting person and the document is taken out and returned in response to the request of any user in the role.

FIG. 12 is a block diagram schematically illustrating the functional configuration of a third embodiment of the electronic document circulating system of the present invention. In FIG. 12, a document management information store unit 113 for storing the document management information for managing document to be circulated is connected to a temporary circulation control information store unit 115, and a circulation control information store unit 111 in which circulation control information for controlling which user receives an electronic circular document and to which user the received document is transmitted is previously stored, a role definition information store unit 112 in which the role definition information for relating a role to a plurality of users is previously stored, and the document management information store unit 113 are connected to a circulation control unit 114 which refers to the temporary circulation control information in the temporary circulation control information store unit 115, the circulation control information and the role definition information to decide a next transmission destination and transmit the circular document.

The operation attending on the request of starting the circulation of a document from the client in this embodiment is the same as in the flow chart of FIG. 3 and the document transmission operation is the same as in the flow chart of FIG. 4. Accordingly, description thereof is omitted.

Operation responsive to the consultation request from the client to another user in this embodiment is now described.

When the consultation request is performed, the user (consulting user) acquires one document from the list of unprocessed documents and requires the list of users in order to consult with another user about the document. The circulation control unit 114 retrieves all users stored in the role definition information store unit 112 and returns the list of users to the consulting user. The consulting user selects a specific user (consulted user) from the list of users and requires to consult with the consulted user. The circulation control unit 114 adds identifiers of the user information of the designated consulted user and the consulting user to the list 115 in the temporary circulation control information in response to the consultation requirement. Further, the circulation control unit 114 deletes the identifier of the document management information of the document to be consulted from the list of unprocessed documents of the consulting users and adds it to the list of unprocessed documents of the consulted user. At this time, the circulation control unit 114 does not set the user name, the node name, the role name and the like in the deleted and added document management information. Further, there is a method in which when the return request to the role described in the second embodiment is performed by the consulted user in error, the presence of a pointer to the temporary circulation control information store unit 115 is examined in order to detect this request and when there is no pointer, control is made to be returned to the role.

The consulted user acquires the document to be consulted by means of the usual operation for acquiring the list of unprocessed documents. When the consultation request is performed to still another user, a next consulted user is selected from the list of users in the same manner as above. Further, when the processing relative to the consultation is completed, the request for returning the document to the consulting user is performed.

When the consulted user performs the request for returning the document to the consulting user, the circulation control unit 114 receives the information recorded in the last of the list 115 in the temporary circulation control information and investigates the user information of the last consulting user. The identifier of the document management information of the document is deleted from the list of unprocessed documents of the consulted user and is added to the list of unprocessed documents of the last consulting user. Further, the information recorded in the last of the list of the temporary circulation control information is deleted.

With the above processing operation, the operation responsive to the consultation request from the client to the other user is completed. The configuration of the circulation control information stored in the circulation control information store unit 111 and the information stored in the role definition information store unit 112 is the same as in the first embodiment and description thereof is omitted.

FIG. 13 shows an example of the information stored in the document management information store unit and the temporary circulation control information store unit in the third embodiment of the electronic document circulating system of the present invention.

As shown in FIG. 13, a pointer to temporary circulation control information 122 in the temporary circulation control information store unit 115 is stored in document management information 121 in addition to the configuration of the document management information shown in FIG. 8. The temporary circulation control information 122 is a list including the identifier of the user information of the consulting user and the identifier of the user information of the consulted user.

As described above, according to the embodiment, in order to consult with another user during circulation of the document, after the temporary circulation control information is defined and the document is circulated to the other user, the document is returned to the consulting user exactly and the circulation of the document can be continued in accordance with the definition of the original circulation route.

Figure 14:
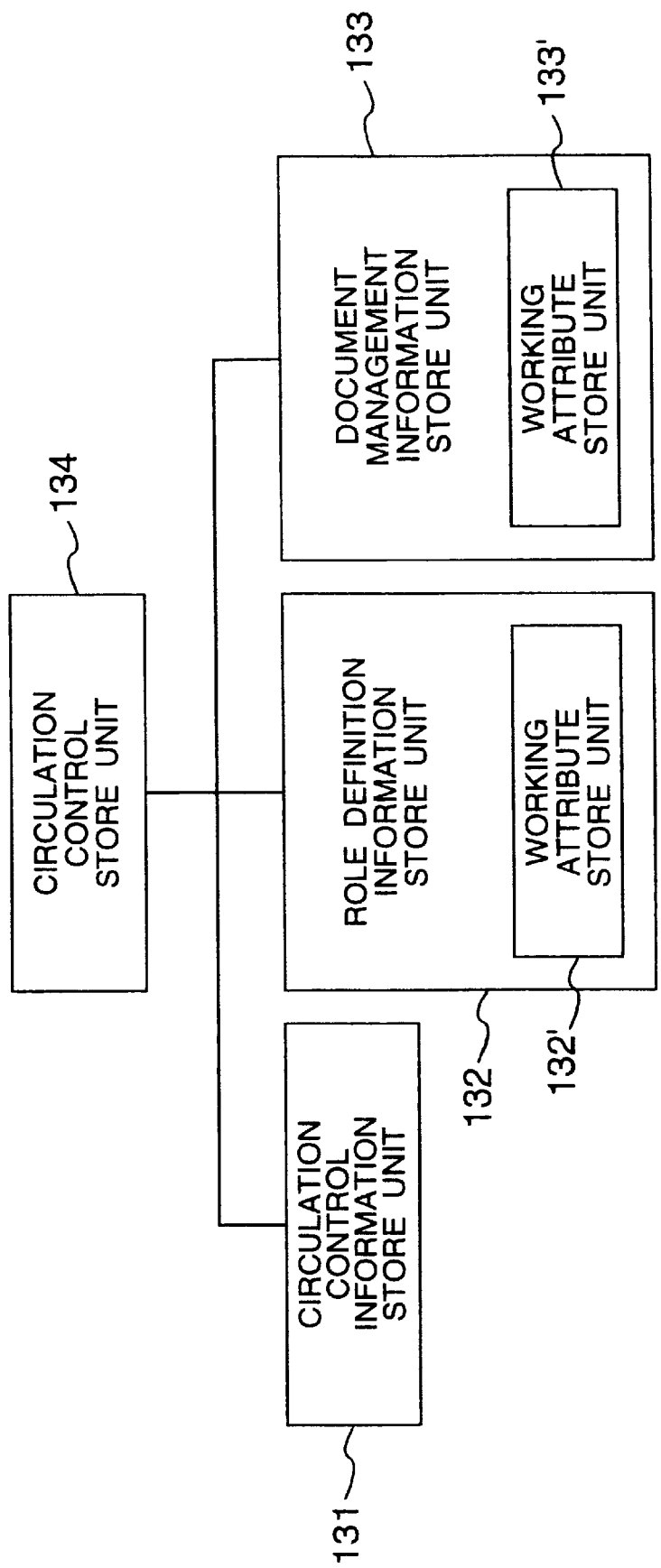
FIG. 14 is a block diagram schematically illustrating the functional configuration of a fourth embodiment of the electronic document circulating system of the present invention.

FIG. 14 is a block diagram schematically illustrating the functional configuration of a fourth embodiment of the electronic document circulating system of the present invention. In FIG. 14, a circulation control information store unit 131 in which circulation control information for controlling which user receives an electronic circular document and to which user the received document is transmitted is previously stored, a role definition information store unit 132 in which the role definition information for relating a role to a plurality of users is previously stored, and a document management information store unit 133 in which the document management information for managing a document to be circulated is stored are connected to a circulation control unit 134 which refers to the circulation control information and the role definition information to decide a next transmission destination and transmit the circular document. The configuration of FIG. 14 is different from that of FIG. 2 in that the role definition information store unit 132 and the document management information store unit 133 include working attribute store units 132' and 133', respectively.

The request of starting the circulation of the document from the client in the electronic document circulating system of this embodiment is the same as in the flow chart of FIG. 3 of the embodiment 1 and accordingly description thereof is omitted.

Operation of modifying the working attribute of the user in this embodiment is now described.

When the user requires to modify the user's own working attribute or when the user having the authority of the system manager requires to modify another user's working attribute, the child-process of the circulation control unit 134 of the server receives the user information of the requiring user. When the authority is for the common user, it is confirmed that the designated user is the user himself and the user's working attribute is modified as designated. With the above processing operation, the modification operation of the user's working attribute is completed.

Operation of transmitting the prepared document in this embodiment is now described.

The daemon of the circulation control unit 134 receives the identifier of the document management information from the transmission queue and acquires the transmission destination from the node information in the same manner as above. Thus, when the transmission destination of the document is a user, the daemon of the circulation control unit refers to the working attribute of the user information of the transmission destination. When "working is possible", the identifier of the document management information is added to the list of unprocessed documents of the user information and when "working is impossible", the identifier of the document management information is added to the list of unprocessed documents of the user information of the user having the authority of the system manager and is deleted from the transmission queue.

Further, when the transmission destination of the document is a role and has the definition that the document is not transmitted to a user automatically, the daemon of the circulation control unit refers to the working attribute of the role information. When "working is possible", the identifier of the document management information is added to the list of unprocessed documents of the role information and when "working is impossible", the identifier of the document management information is added to the list of unprocessed document of the user information of the user having the authority of the system manager and is deleted from the transmission queue. In addition, when the transmission destination of the document is a role and has the definition that the document is transmitted to the user in the role automatically, the daemon of the circulation control unit 134 refers to the working attributed of the role information. When "working is possible", the identifier of the document management information is added to the list of unprocessed documents of the user information decided in accordance with the selection method and when "working is impossible", the identifier of the document management information is added to the list of unprocessed documents of the user information of the user having the authority of the system manager and is deleted from the transmission queue. When the user is decided in accordance with the selection method, the circulation control unit refers to the working attribute of the information relating the role to the user and the working attribute of the user information and the user having "working being possible" is selected for any case. When there is no user having "working being possible" for any case, addition is made to the list of system managers in the same manner as above. Instead of addition to the list of system managers, there are a method of returning to the list of user information of a transmission requiring user and a method of adding to the list of unprocessed documents of the role information or the user information of the transmission destination but incapable of acquiring the document until the state of "working being possible" is reached.

Further, when addition is made to the list of unprocessed documents of the user information of the system manager, the system manager changes the user or role to be transmitted to the state of "working being possible" and designates the node of the circular route to require the transmission of the document.

With above processing operation, the operation of transmitting the document is completed.

The configuration of the circulation control information in the circulation control information store unit 131 is the same as in FIG. 6 and description thereof is omitted.

FIG. 15 shows an example of information stored in the role definition information store unit in a fourth embodiment of the electronic document circulating system of the present invention and shows the role information, the user information and the relation information of the role and the user in the role definition information store unit 132. Other information has the same configuration as in FIG. 7 and description thereof is omitted. As shown in FIG. 15, each of the role information 141, the user information 142 and the relation information 143 of the role and the user includes the working attribute in addition to the same configuration as in the second embodiment. The configuration of the document management information stored in the document management information store unit 133 is the same as in FIG. 8 and description thereof is omitted.

As described above, according to the embodiments, the user who cannot process the document for certain reasons does not define a proxy and sets the user information of the user to the state of "working being impossible", so that when the document to be transmitted to the role is transmitted, the document can be controlled to be transmitted to another user in the role and when the document to be transmitted to the user is transmitted, the document can be controlled not to be transmitted to the user. Further, the whole role can be set to the state of "working being impossible", so that the document can be controlled not to be transmitted to the role, and a certain user can be set to the state of "working being impossible" for only a specific role, so that only the document to another role or the document to the user can be controlled to be transmitted to the user.

What is claimed is:

1. A computer program for use in electronic document circulating system for circulating an electronic circular document among users in a network system in which a server machine and a plurality of client machines which a plurality of users can utilize respectively are interconnected through a network, said computer program comprising:

a processing section for storing in a memory area a plurality of types of circulation control information for specifying a plurality of predetermined circular routes of the circular document, each of said circular routes being indicated by a plurality of nodes, at least one operation process of said node being defined by a role, wherein a plurality of users who perform equal processing operation are named said role generically;

a processing section for storing in a memory area role definition information relative to said role; and a processing section for storing in a memory area document management information relative to the circular document to be circulated, wherein when a circulation start request of a circular document is received through a related client from a user who designates one circular route and said circular document is then transmitted to the node defined by the role in said designated circular route, a circulation control unit in said server machine selects one user in said role on the basis of contents stored in said memory areas and transmits said circular document to said user.

2. The computer program according to claim 1, wherein each type of said circulation control information includes information indicative of at least one selection criterion necessary to select one user from said role.

3. The computer program according to claim 2, wherein said selection criterion includes a "random" selection criterion for selecting one user at random from the users in said role.

4. The computer program according to claim 2, wherein said selection criterion includes a "sequence" selection criterion and each type of said circulation control information includes information indicative of a user who has transmitted the circular document at the last time in said role, said circulation control unit selecting a next user of said user who has transmitted the circular document at the last time from a list of users in said role when one user is selected on the basis of said "sequence" selection criterion.

5. The computer program according to claim 2, wherein said selection criterion includes a "allocation rate" selection criterion for weighting each of the users in said role in accordance with a predetermined allocation rate and then selecting one user from the users at random.

6. The computer program according to claim 2, wherein said selection criterion includes a "burden" selection criterion for previously setting a burden of a process to each of the users in said role and selecting a user having a largest difference between the set burden and a current burden.

7. The computer program according to claim 2, wherein said selection criterion includes a "recursive" selection criterion and said document management information includes information indicative of a user who has processed said circular document at the last time in said role, said circulation control unit referring to said document management information together with said circulation control information on the basis of said "recursive" selection criterion and selecting as a user at a transmission destination the user who has processed said circular document at the last time from a list of users in said role.

8. The computer program according to claim 2, wherein said selection criterion includes a "priority order" selection criterion and said document management information includes information indicative of a user who processes the document in priority in said role, said circulation control unit referring to said document management information together with said circulation control information based on the said "priority order" selection criterion and selecting as a user at a transmission destination the user who processes the document by priority from a list of users in said role.

9. The computer program according to claim 1, wherein said role definition information includes a list of unprocessed documents in said role and said circulation control unit responds to a reception request of an unprocessed document from a user who belongs to said role and designates one of unprocessed documents in said role to transmit said designated unprocessed document to the user requiring the reception.

10. The computer program according to claim 9, wherein said role definition information includes a list of uncompressed documents of each of the users in said role and said circulation control unit deletes the unprocessed document required to be received, from the list of unprocessed documents in said role and adds the unprocessed document required to be received, to the list of unprocessed documents of the user requiring the reception.

11. The computer program according to claim 10, wherein said circulation control unit responds to a return request to said role of the uncompressed document required to be received, from the user requiring the reception to delete the uncompressed document required to be received, from the list of unprocessed documents of the user requiring the reception and add the unprocessed document required to be received, to the list of unprocessed documents in said role.

12. The computer program according to claim 1, wherein said document management information includes a temporary pair of a requiring user and a user at a transmission destination of said document deviated from the designated circular route and said circulation control unit refers to said temporary pair of the requiring user and the user at the transmission destination of said document in said document management information to transmit said circular document to the user at the transmission destination and then responds to a transmission request of said circular document from the user at the transmission destination to transmit said circular document to the transmission destination to thereby complete a temporary circulation of the document.

13. The computer program according to claim 12, wherein a plurality of temporary pairs of the requiring users and the users at the transmission destination of the document constitute a chain and said circulation control unit traces said chain of said plurality of temporary pairs of the requiring users and the user at the transmission destination of the document to thereby perform the temporary circulation of the document.

14. The computer program according to claim 1, wherein said role definition information includes working possible information indicting whether each of the users in said role can receive the circular document or not and when said circular document is transmitted to the node defined in the role in the designated circular route, said circulation control unit selects one user in said role from the users having said working possible information indicating that working is possible to transmit the circular document to said selected user.

15. The computer program according to claim 1, wherein said role definition information includes working possible information indicating whether the role can receive the circular document or not and when the circular document is transmitted to the node defined in the role in the designated circular route, said circulation control unit confirms that the role includes said working possible information indicating that working is possible and then selects one user in the role to transmit the circular document to said selected user.

16. The computer program according to claim 14, wherein said role definition information includes user type information indicating whether each of the users in said role is a manager or not and the user having said user type information indicative of the manager can modify said working possible information.

17. The computer program according to claim 15, wherein said role definition information includes user type information indicating whether each of the users in said role is a manager or not and the user having said user type information indicative of the manager can modify said working possible information.

* * * * *